US012306988B2

(12) United States Patent
Kaul et al.

(10) Patent No.: US 12,306,988 B2
(45) Date of Patent: May 20, 2025

(54) IMAGE STORAGE ACROSS DISTRIBUTED COMPUTING SYSTEMS

(71) Applicant: International Business Machines Corporation, Armonk, NY (US)

(72) Inventors: Abhishek Kaul, Singapore (SG); Sachin Gupta, Singapore (SG); Pramod Vadayadiyil Raveendran, Bengaluru (IN); Seema Nagar, Bangalore (IN); Kuntal Dey, Rampurhat (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/321,227

(22) Filed: May 22, 2023

(65) Prior Publication Data

US 2023/0289471 A1    Sep. 14, 2023

Related U.S. Application Data

(63) Continuation of application No. 17/193,025, filed on Mar. 5, 2021, now Pat. No. 11,687,668.

(51) Int. Cl.
*G06F 21/62* (2013.01)
*G06T 5/50* (2006.01)
(Continued)

(52) U.S. Cl.
CPC ............ *G06F 21/6245* (2013.01); *G06T 5/50* (2013.01); *G06T 7/11* (2017.01); *G06T 7/73* (2017.01);
(Continued)

(58) Field of Classification Search
CPC ......... G06F 21/6245; G06F 2221/2113; G06T 5/50; G06T 7/11; G06T 7/73;
(Continued)

(56) References Cited

U.S. PATENT DOCUMENTS 8,612,854 B2 * 12/2013 Eisen ............... H04N 1/4486
715/272
10,552,633 B2    2/2020 Ishida et al.
(Continued)

FOREIGN PATENT DOCUMENTS

CN       111935486 A       11/2020
DE    102012007217 A1      10/2013

OTHER PUBLICATIONS

Campbell et al., "IrisNet: An Internet-Scale Architecture for Multimedia Sensors," 2005, Association for Computing Machinery, p. 81-88. (Year: 2005).*

(Continued)

*Primary Examiner* — Amandeep Saini
*Assistant Examiner* — Daniella M. DiGuglielmo
(74) *Attorney, Agent, or Firm* — Jared C. Chaney

(57) ABSTRACT

Provided is a method, system, and computer program product for storing images across multiple distributed computing systems according to image sensitivity. The method comprises identifying an image and analyzing the image to identify sensitive information in the image. The method further comprises splitting the image into a sensitive portion and a non-sensitive portion. The method further comprises storing the sensitive portion of the image in a first distributed computing system and storing the non-sensitive portion of the image in a second distributed computing system.

20 Claims, 7 Drawing Sheets

(51) Int. Cl.

| | |
|---|---|
| *G06T 7/11* | (2017.01) |
| *G06T 7/73* | (2017.01) |
| *G06V 10/22* | (2022.01) |
| *G06V 10/25* | (2022.01) |
| *G06V 10/40* | (2022.01) |
| *G06V 10/75* | (2022.01) |
| *G06V 30/10* | (2022.01) |
| *H04L 9/40* | (2022.01) |
| *H04L 67/1097* | (2022.01) |

(52) U.S. Cl.
CPC .............. *G06V 10/22* (2022.01); *G06V 10/25* (2022.01); *G06V 10/40* (2022.01); *G06V 10/751* (2022.01); *H04L 63/102* (2013.01); *H04L 63/105* (2013.01); *H04L 67/1097* (2013.01); *G06F 2221/2113* (2013.01); *G06T 2207/20221* (2013.01); *G06V 30/10* (2022.01); *H04L 63/0428* (2013.01)

(58) Field of Classification Search
CPC .......... G06T 2207/20221; G06V 10/22; G06V 10/25; G06V 10/40; G06V 10/751; G06V 30/10; H04L 63/102; H04L 63/105; H04L 67/1097; H04L 63/0428
See application file for complete search history.

(56) References Cited

U.S. PATENT DOCUMENTS

| | | | | |
|---|---|---|---|---|
| 2010/0005509 | A1* | 1/2010 | Peckover | ............ H04L 63/0281 |
| | | | | 726/3 |
| 2010/0325422 | A1* | 12/2010 | Gnanasambandam | ...................... |
| | | | | G06F 16/122 |
| | | | | 713/153 |
| 2013/0223758 | A1* | 8/2013 | Hou | ...................... G06T 3/4038 |
| | | | | 382/274 |
| 2015/0188922 | A1* | 7/2015 | Parmar | ................... G06F 21/33 |
| | | | | 726/29 |
| 2016/0203264 | A1* | 7/2016 | Danner | .................... H04N 1/38 |
| | | | | 382/128 |
| 2016/0306798 | A1 | 10/2016 | Guo et al. | |
| 2016/0366217 | A1 | 12/2016 | Eda et al. | |
| 2017/0149737 | A1* | 5/2017 | Betzler | ................. H04W 12/02 |
| 2019/0050558 | A1* | 2/2019 | LeMay | ................... G06F 21/54 |
| 2020/0076578 | A1* | 3/2020 | Ithal | .................... H04L 63/0272 |
| 2020/0293684 | A1* | 9/2020 | Harris | ................... H04W 12/02 |
| 2022/0284118 | A1 | 9/2022 | Kaul et al. | |

OTHER PUBLICATIONS

Google, "Inspecting images for sensitive data," https://cloud.google.com/dlp/docs/inspecting-images, printed Dec. 4, 2020, 10 pgs.

IBM, "What is Enterprise Content Management," https://www.ibm.com/cloud/automation-software/enterprise-content-management, printed Dec. 4, 2020, 1 pg.

Jana et al., "Secured transmission of sensitive images of skin diseases using steganography and cryptography," https://www.researchgate.net/publication/323000563_Secured_transmission_of_sensitive_images_of_skin_diseases_using_steganography_and_cryptography, Conference: 2017 IEEE Calcutta Conference (CALCON), Dec. 2017, DOI: 10.1109/CALCON.2017.8280703, 4 pgs.

Liu et al., "Detection of Sensitive Images Based on Affinity Propagation Clustering," https://www.researchgate.net/publication/252761734_Detection_of_sensitive_images_based_on_affinity_propagation_clustering, Oct. 2009, Proceedings of SPIE—The International Society for Optical Engineering, DOI: 10.1117/12.832756 , 7 pgs.

Mell et al., "The NIST Definition of Cloud Computing," Recommendations of the National Institute of Standards and Technology, U.S. Department of Commerce, Special Publication 800-145, Sep. 2011, 7 pgs.

Yang et al., "Automated identification of sensitive data from implicit user specification," https://cybersecurity.springeropen.com/articles/10.1186/s42400-018-0011-x, Cybersecurity (2018) 1:13.

List of IBM Patents or Patent Applications Treated as Related, May 22, 2023, 2 pgs.

* cited by examiner

IMAGE STORAGE ACROSS DISTRIBUTED COMPUTING SYSTEMS

BACKGROUND

The present disclosure relates generally to the field of computing, and more particularly to storing images across multiple distributed computing systems according to image sensitivity.

Organizations generate and store large amounts of data, with the amount of data being generating and stored continuing to increase. As such, the costs of storing the data is also increasing. In the past, this meant storing all of the data in servers owned and operated by the organization. However, the cost of building sufficient onsite storage (e.g., CapEx costs), maintaining it on-premise, support costs to the vendor, skills required to manage it, and the cost of maintaining it over time are important factors to consider. Many organizations cannot afford the cost of storing all of their data on-premise. As such, organizations have turned to cloud-based storage solutions.

SUMMARY

Embodiments of the present disclosure include a method, computer program product, and system for returning an image to a user where the image is stored across multiple distributed computing systems according to image sensitivity. The method comprises receiving a request for an image from a requestor and authenticating that the requestor is permitted to receive the image. The image includes a sensitive portion and a non-sensitive portion that are stored in different computing environments. The method further comprises retrieving the sensitive portion of the image from a first distributed computing system and retrieving the non-sensitive portion of the image from a second distributed computing system. The method further comprises recombining the sensitive and non-sensitive portions to recreate the image and returning the recreated image to the requestor.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
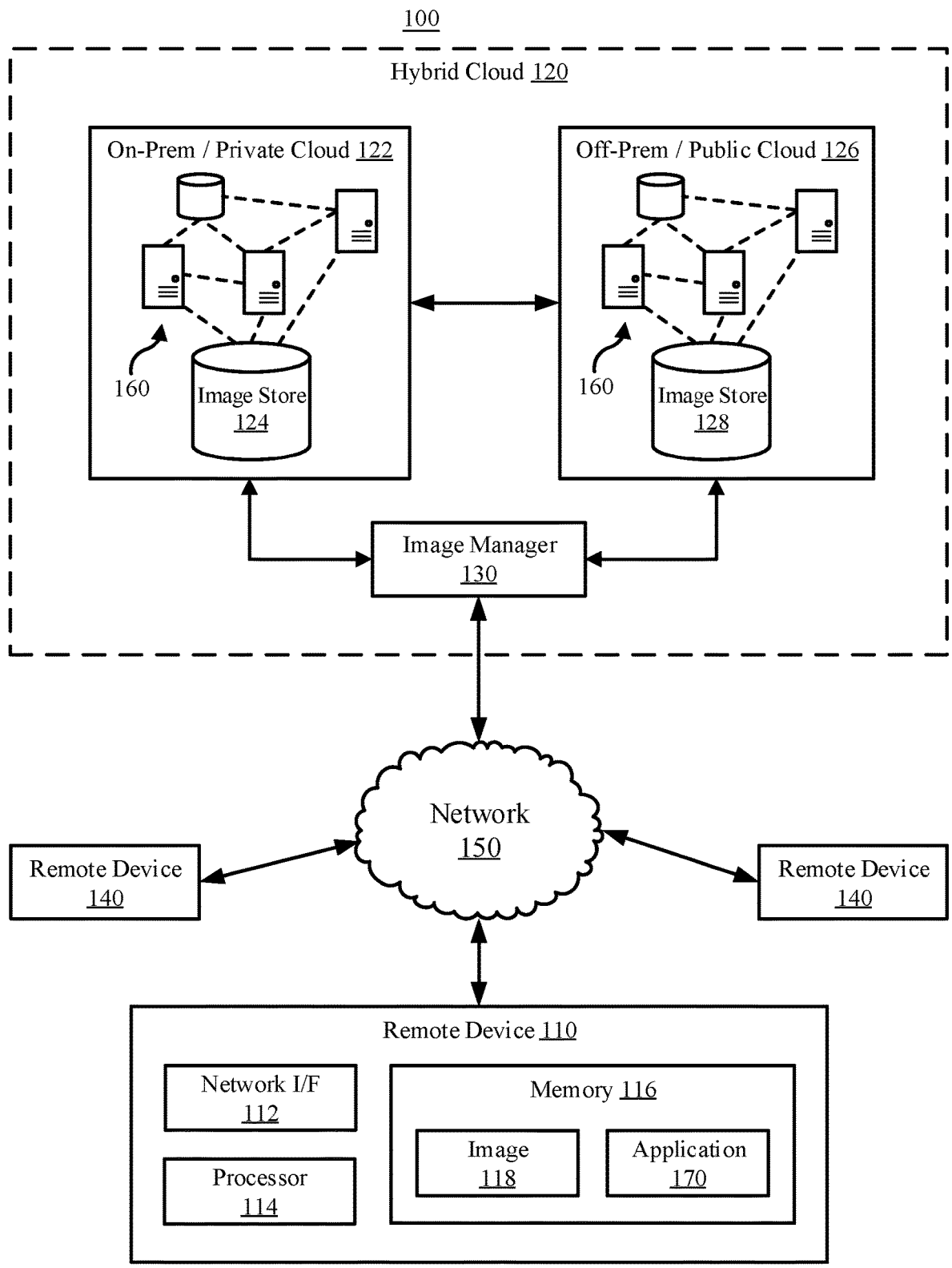
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to storing images across multiple distributed computing systems according to image sensitivity. While the present disclosure is not necessarily limited to such applications, various aspects of the disclosure may be appreciated through a discussion of various examples using this context.

Organizations generate and store large amounts of data, with the amount of data being generating and stored continuing to increase. As such, the costs of storing the data is also increasing. In the past, this meant storing all of the data in servers owned and operated by the organization. However, the cost of building sufficient onsite storage (e.g., CapEx costs), maintaining it on-premise, support costs to the vendor, skills required to manage it, and the cost of maintaining it over time are important factors to consider. Many organizations cannot afford the cost of storing all of their data on-premise. As such, organizations have turned to cloud-based storage solutions. However, the cheaper cloud-based solutions may not meet the security requirements of the business when it comes to their most sensitive data. To balance costs and security, organizations may keep their sensitive data within the organization (e.g., on-premise or in a more secure cloud) and their non-sensitive data in a public cloud that provides cheap, scalable storage.

One type of data that many organizations generate is image data, with some organizations generating a large number of images that have to be kept by the organization. When compared to other types of data, storing images requires a large amount of computer storage space. Depending on the industry, the number of images, the amount of time, and the type of storage that is required varies. For example, in the case of financial companies, many of the scanned documents are stored for years (in some cases 7 years or more) as part of regulatory requirements. Furthermore, as techniques to derive information/insights from unstructured data gets more popular, organizations need to store these images for a longer amount of time to fully extract the value from the images.

However, images often contain sensitive information, such as personally identifiable information, medical information, financial information, etc. This is especially true in certain industries, such as the financial or healthcare industries. For example, scanned copies of account opening forms, know your customer (KYC) information in the banking sector, invoices and other financial documents in all industries, images in the healthcare industry, audit pictures of sensitive areas of any organization, and traffic violation related pictures may contain sensitive content and be subject to strict regulatory rules regarding their storage. Even if the sensitive data is only a small portion of the image, these images may subject to strict data privacy and protection rules, and therefore require a much more expensive off-premise storage solution that guarantees the security of the data or even on-premise storage. Compliance with these requirements by storing any image that contains such sensitive data can be extremely expensive.

Embodiments of the present disclosure may address the above and other problems with current solutions by enabling images with sensitive information to be stored across different distributed computing environments. This may be achieved by analyzing each image and identifying the sensitive and non-sensitive portions of the image based on the enterprise data and compliance policies. The images are then split, the sensitive portions of the image are then stored in sensitive data clusters (e.g., within on-premise storage, in secured off-premise storage, etc.), and the non-sensitive portions of the image are stored at inexpensive storages in cloud clusters. Accordingly, the amount of image data that has to be stored on-premise (or in the most expensive, secure off-premise locations) can be significantly reduced.

In some embodiments, the system may update an "image sensitivity database" with the locations and boundary information of the sensitive and non-sensitive portions of image when splitting and storing the image. The location information may be used to subsequently retrieve the portions of the image so that they can be recombined when requested, and the boundary information may be used by the system to determine how the portions should be recombined (e.g., which edges of the different portions should be stitched together, where each portion belongs in the final image, etc.). Additionally, the system may store the image's hash value and other attributes and relations in the enterprise context. The hash value may be used both to identify the image, and to identify any identical images that have been stored. If an identical image has already been storage, the system may create a link to the existing record for the identical image. Accordingly, the hash value may also be used in deduplication of images and avoiding storage. The hash value may be generated for the image using known image hashing processes.

Embodiments further include methods, systems, and computer program products for recombining the sensitive and non-sensitive portions of the image in response to a request for the complete image. When a user requests the image, the system identifies the locations of the various portions of image spread across different on-premise and off-premise locations. The system may use the image sensitivity database to identify the location of the various portions of the image. The system may search the image sensitivity database using the hash value of the image and retrieve the corresponding location and boundary information. For example, when the image was originally split into sensitive and non-sensitive portions and stored, the system may have saved the hash value for the image and the location of each portion in the image sensitive database, along with any information necessary to recombine the portions (the boundary information). The system may retrieve the portions using the location data from the image sensitivity database, combine the image portions to make the original image, and provide the complete image to a user.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates a block diagram of an example computing environment 100 in which illustrative embodiments of the present disclosure may be implemented. The computing environment 100 includes a remote device 110 that is communicatively coupled to a hybrid cloud 120 via a network 150. The computing environment 100 may further include one or more other remote devices 140. Each of the other remote devices 140 may, in some embodiments, be substantially similar to, or the same as, remote device 110.

Consistent with various embodiments, the remote device 110 may be a computer system. The remote device 110 may include one or more processors 114 and one or more memories 116. The one or more memories 116 may contain one or more images 118 and one or more applications 170. The remote device 110 may be configured to communicate with the hybrid cloud 120 through an internal or external network interface 112. The network interface 112 may be, for example, a modem or a network interface card. The remote device 110 may be equipped with a display or monitor. Additionally, the remote device 110 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 110 may be a server, desktop, laptop, or hand-held device.

The hybrid cloud 120 may include one or more private (e.g., on-premise) clouds 122 and one or more public (e.g., off-premise) clouds 126. The hybrid cloud 120 may further include an image manager 130. Each of the private and public clouds 122, 126 may include a plurality of nodes 160. The nodes 160 may include any types of nodes, including compute nodes, management nodes, and storage nodes. Additionally, the private and public clouds 122, 126 may each include one or more image stores 124, 128, respectively. The private and public clouds 122, 126 may be configured to communicate with each other.

The image manager 130 may be configured to process requests received from the remote device 110. For example, the image manager 130 may be configured to receive a request for an image, authenticate the request (e.g., ensure that the requestor has permission to receive the image), and process the request. In some embodiments, processing the request may include determining whether the requested image is stored as a complete image (e.g., in either the private cloud image store 124 or the public cloud image store 128) or whether the image have been split. This may be done by performing a lookup operation on an image sensitivity database to retrieve a record for the image using information contained in the request (e.g., a hash value of the image, a name of the image, etc.). Upon receiving the record for the image, the image manager 130 may determine whether the image has been split into multiple portions or not. For example, the image manager 130 may determine whether the image has been split by looking for a flag in the record.

In embodiments where the image has been split, the image manager 130 may further determine the locations of each portion of the image and retrieve the boundary information from the record. The location information in the record may indicate where in the private cloud image store 124 the sensitive portions of the image are stored and where in the public cloud image store 128 the non-sensitive portions of the image are stored. The image manager 130 may then retrieve both the sensitive portion and the non-sensitive portion of the image from the image stores 124, 128. Using the boundary information, the image manager 130 may merge, stitch, or otherwise combine the sensitive portion and the non-sensitive portion of the image to form a complete (combined) image. The image manager 130 may then return the complete image to the remote device 110.

In some embodiments, the image manager 130 may be further configured to analyze images stored in the private cloud image store 124 and determine whether they contain sensitive data. Images that don't contain sensitive data may be moved to the public cloud image store 128 to reduce costs. Furthermore, the image manager 130 may be configured to determine whether images that do include sensitive data can be split up and stored across different distributed computing systems (e.g., in both the private cloud 122 and the public cloud 126). If an image contains sensitive data but cannot be split up, the image may be left in its complete form in the private cloud image store 124. For example, images that are entirely or almost entirely (e.g., above a threshold) made up of sensitive data may benefit very little from being split up, and as such may be left in the private cloud image store 124. Additionally, some images may contain information that is so sensitive that the image manager 130 determines they cannot be split up under any circumstances. This may be based on, for example, user or organization preferences and/or security and compliance regulations. These images would also be kept in the private cloud image store 124.

If the image manager 130 determines that an image in the private cloud image store 124 can be split up, the image manager 130 may first determine whether the image has already been split up. To do this, the image manager 130 may compare a hash value of the image to hash values of images recorded in the image sensitivity database. If the image manager 130 finds a match, which indicates that the image has already been split up and stored across the distributed computing systems, the image manager 130 may instead create a link to the existing record for the image, and then delete the image from the private cloud image store 124.

On the other hand, if the image manager determines that the image has not yet been split up, the image manager 130 may retrieve the image and analyze the image using compliance policies and regulations to determine which parts of the image are sensitive (i.e., contain sensitive data) and which parts are not sensitive (i.e., do not contain sensitive data). The image manager 130 may use known image processing techniques to determine whether parts of the image are sensitive, as would be recognized by persons of ordinary skill in the art.

The image manager 130 may then split the image into sensitive and non-sensitive portions, store the sensitive portion back in the private cloud image store 124, and store the non-sensitive portion in the public cloud image store 128. Additionally, the image manager 130 may update a record in the image sensitivity database (not shown) to indicate the locations of the sensitive and non-sensitive portions in the respective image stores 124, 128, as well as the boundary information (i.e., the information necessary for recombining the image portions into the complete image). The image manager 130 may also store a hash value of the complete image in the image sensitivity database, as necessary, and set a flag in the record for the image that indicates that the image has been split. The image manager 130 may split the image into sensitive and non-sensitive portions using any suitable image processing techniques, as would be recognized by persons of ordinary skill in the art.

While the image manager 130 is shown as being inside the hybrid cloud 120, but not inside either the private cloud 122 or the public cloud 126, this is done for illustrative purposes. In some embodiments, the image manager 130 could be in either the private cloud 122 or the public cloud 126, and in some embodiments the image manager 130 (or multiple image managers 130) may be in both of the private cloud 122 and the public cloud 126. Additionally, the image manager 130 may be part of the hybrid cloud communication/management fabric that allows the private cloud 122 and the public cloud 126 to interact, share data and applications, etc.

The remote device 110 and the image manager 130 may be distant from each other and communicate over a network 150. In some embodiments, the image manager 130 may be a central hub from which remote devices 110 can establish a communication connection, such as in a client-server networking model. Alternatively, the remote device 110 and the image manager 130 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote device 110 and the image manager 130 may be local to each other and communicate via any appropriate local communication medium. For example, the remote device 110 and the image manager 130 may communicate using a local area network (LAN), one or more hardwire connections, a wireless link or router, or an intranet. In some embodiments, the remote device 110 and the image manager 130 may be communicatively coupled using a combination of one or more networks and/or one or more local connections. For example, the image manager 130 may be hardwired to the remote device 110 (e.g., connected with an Ethernet cable) while other remote devices 140 may communicate with the image manager 130 using the network 150 (e.g., over the Internet).

In some embodiments, the network 150 can be implemented within a cloud computing environment, or using one or more cloud computing services. For example, the network 150 may be part of the hybrid cloud 120. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150. In some embodiments, the network 150 may be substantially similar to, the same as, or part of the cloud computing environment 50 described with respect to FIG. 6.

FIG. 1 is intended to depict the representative major components of image processing environment 100. In some embodiments, however, individual components may have greater or lesser complexity than as represented in FIG. 1, components other than or in addition to those shown in FIG. 1 may be present, and the number, type, and configuration of such components may vary. Likewise, one or more components shown within the image processing environment 100 may not be present, and the arrangement of components may vary.

For example, while FIG. 1 illustrates an example image processing environment 100 having an image manager 130 and three remote devices 110, 140 that are communicatively coupled via a single network 150, suitable network architectures for implementing embodiments of this disclosure may include any number of host devices, image managers, public clouds, private clouds, remote devices, and networks. The various models, modules, systems, and components illustrated in FIG. 1 may exist, if at all, across a plurality of host devices, remote devices, and networks.

Figure 2:
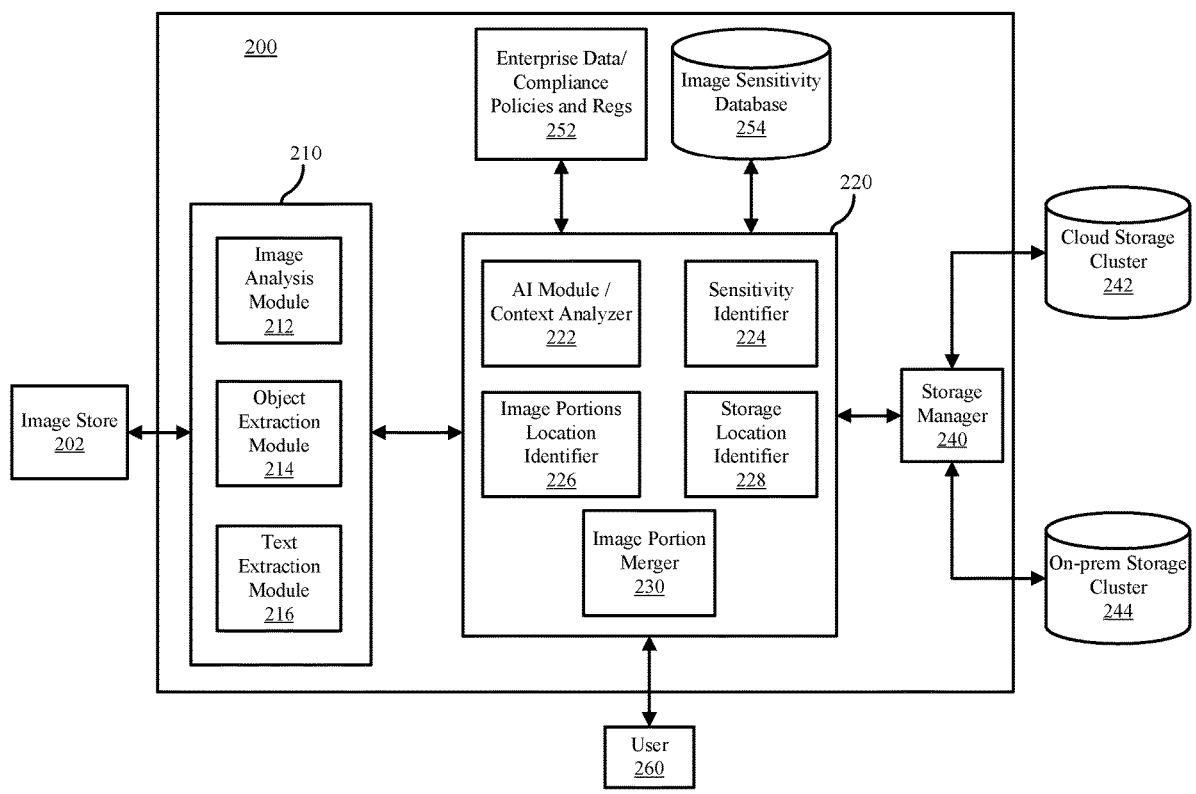
FIG. 2 illustrates a block diagram of a system for storing portions of images in different distributed computing systems based on the sensitivity of content in the images, in accordance with embodiments of the present disclosure.

Referring now to FIG. 2, illustrated is a block diagram of an image processing system 200 for storing portions of images in different distributed computing systems based on the sensitivity of content in the images, in accordance with embodiments of the present disclosure. The image processing system 200 may include, be substantially similar to, or be the same as, the image manager 130 discussed above with respect to FIG. 1. In some embodiments, the image processing system 200 includes a feature extraction subsystem 210, a sensitivity analysis and processing subsystem 220, a storage manager 240 (e.g., a storage controller), data compliance policies and regulations 252, and an image sensitivity database 254.

The feature extraction subsystem 210 may be configured to retrieve (or receive) images from the image store 202. The image store 202 may be in a hybrid cloud environment (e.g., private cloud image store 124 or public cloud image store 128), or it may be in an external system (e.g., remote device 110). After retrieving the image, the feature extraction subsystem 210 utilizes existing object detection and text extraction techniques to extract the objects and text present in the image. For example, the feature extraction subsystem 210 may include an image analysis module 212 that is configured to analyze the image and determine portions of the image that contain recognizable objects and text. Then, the object extraction module 214 and the text extraction module 216 may use the output from the image analysis module 212 to analyze the portions of the image having objects and text to extract the various objects and text. The extracted features from the image may then be sent by the feature extraction subsystem 210 to the sensitivity analysis and processing subsystem 220 for further processing.

As an illustrative example, the image may be a patient's medical record, such as a medical text report. As such, the image may contain text (e.g., the patient's name, age, or any other attribute) and one or more objects (e.g., scan results). The feature extraction subsystem 210 may analyze the received image to identify and extract the text and objects from the image, and then send the extracted features, along with the image itself, to the sensitivity analysis and processing subsystem 220.

The sensitivity analysis and processing subsystem 220 may be configured to analyze the received images using the extracted features and the data compliance policies and regulations 252 to determine how to split the image into two or more portions. In other words, given the objects and text present in the image, sensitive portions of the image are detected using the rules fed to the system. This may be done using a sensitivity identifier 224 that analyzes the extracted features (e.g., the objects and text) using the data compliance policies and regulations 252. Individual text, objects, or the combination of objects and text is analyzed to identify the sensitivity in the specified context using the rules specified in the data compliance policies and regulations 252.

The data compliance policies and regulations 252 may be specific to the type of data where the system 200 is being deployed. For example, some systems 200 may contain financial rules, while other systems may contain rules related to healthcare data. An example of a rule that may be included in the data compliance policies and regulations 252 for a healthcare provider is that name or age of a patient may be considered sensitive. As another example, a combination of data may need to be included in the image (e.g., a name combined with the scan result) for the sensitivity identifier 224 to flag the data as sensitive. In yet another example, medical scan results may be considered sensitive data, even if they are not accompanied by a name or other identifier for the patient.

In some embodiments, the system is bootstrapped with the rules learned from an organization's polices. These rules can be auto-learned from the policy documents using the AI module/context analyzer 222 or manually derived by subject matter experts. Further, the rules can be updated over time based on the accuracy of the rule system. Periodically, a provision can be kept for human intervention. The output of the rule system can be validated by a human, and corrections are fed back to update the rules. The iterative process to update the rules help in not missing the sensitive data from an image, and also new rules can be added to the system with time.

In some embodiments, the AI module/context analyzer 222 may be configured to analyze the information received from the feature extract subsystem 210 to provide additional context. For example, text that may not seem sensitive in some contexts may actually be very sensitive in other contexts, and the AI module/context analyzer may be configured to identify the context in which the extracted features exist. The sensitivity identifier 224 may utilize this contextual information to help with the classification of the sensitivity of the data in the image.

Once the sensitivity is determined, the sensitivity identifier 224 may add a label to the image that identifies the sensitivity of the entire image. The label may be based on, for example, the most sensitive information included in the image. This may be done to ensure that images having data of different sensitivities are treated, by default, in accordance with the policies for the most sensitive data in the image.

The sensitivity analysis and processing subsystem 220 may be configured to split the image into two or more portions based on the sensitivity of the image. For example, an image that contains some sensitive data and some non-sensitive data may be split into two portions: one that includes the sensitive data, and one that includes only the non-sensitive data. Location and boundary of the sensitive information (e.g., objects) is also identified by the image portions location identifier 226 using thresholding, classification, and segmentation techniques.

The information related to the sensitive and non-sensitive image portions are stored in the image sensitivity database 254. In some embodiments, the image sensitivity database 254 contains a record for each image with the image name, hash value, associated application, image metadata, location and boundary information about sensitive portions of data and non-sensitive portions of data, and the stored location of the sensitive and non-sensitive portions of the image. As discussed herein, the image hash value may be stored in the image sensitivity database 254 so that the same steps don't need to be repeated again and again for the same images, and the record for the image will be linked to the existing similar record within the image sensitivity database 254 instead.

After identifying the sensitive portion(s) of the image, the sensitive portion(s) are taken out of the image and moved to a secure storage environment. The secure storage environment may be on-premise storages (e.g., on-premise storage cluster 244) or eligible sensitive clusters within the cloud. This may be done by the storage manager 240. Furthermore, the location of where the sensitive portion is stored is updated in the image sensitivity database 254 by the storage location identifier 228. Similarly, the storage manager 240 moves the non-sensitive portion of the image to cloud storage (e.g., cloud storage cluster 242). The storage location identifier 228 then stores the non-sensitive portion's location in the image sensitivity database 254.

In some embodiments, the system 200 monitors health check parameters such as firewall configuration, unauthorized access, and any other activity which might indicate potential misuse of the data on the sensitive clusters. Further, a health score is maintained for each sensitive cluster based on the activities which might have been performed. If the health score falls below a threshold, a sensitive cluster is automatically removed by the system 200 from the list of sensitive clusters.

Furthermore, each enterprise may have data clusters within their own multiple data centers, private clouds hosted at vendor data clusters, and multiple public cloud data clusters located across the world. Also, it has a list of data centers (and data clusters it carries) with attributes associated to the data that it can carry based on the sensitivity of the data. The system 200 may maintain a data sensitivity level of each cluster and data cluster based on the sensitivity, security, privacy, industry and domain specific certifications the data cluster has, the country in which the data cluster is located, the country in which the enterprise operates under the jurisdiction of, etc. The system 200 may utilize this list of information to determine where data can be stored. In many cases, it will be on-premise for the regulated industries.

In some embodiments, the system 200 may be further configured to respond to user 260 (or application) requests for an image. When the user 260 or remote system requests the image, the image sensitivity database 254 is checked based on the image's attributes stored in image sensitivity database 254. The entry for the particular image is retrieved, including the location of the sensitive and non-sensitive portions of the image. Both portions of image are collected and merged by the image portion merger 230 using the location of each portion of image from the image sensitivity database 254. The portions may be merged using any suitable technique for stitching or combining images, as would be recognized by persons of ordinary skill in the art. After merging the image into a complete image, the image is returned to the user 260 or system that requested it.

The above way of stitching the image first and then displaying to the end user might result in some delay, which may be fine for some applications. For the applications where the extra delay is not tolerable, stitching may not be performed. Instead all the portions of the image are sent to the front end (where the image is going to be displayed), and the front end system can start showing the image portions while stitching at the same time.

Figure 3:
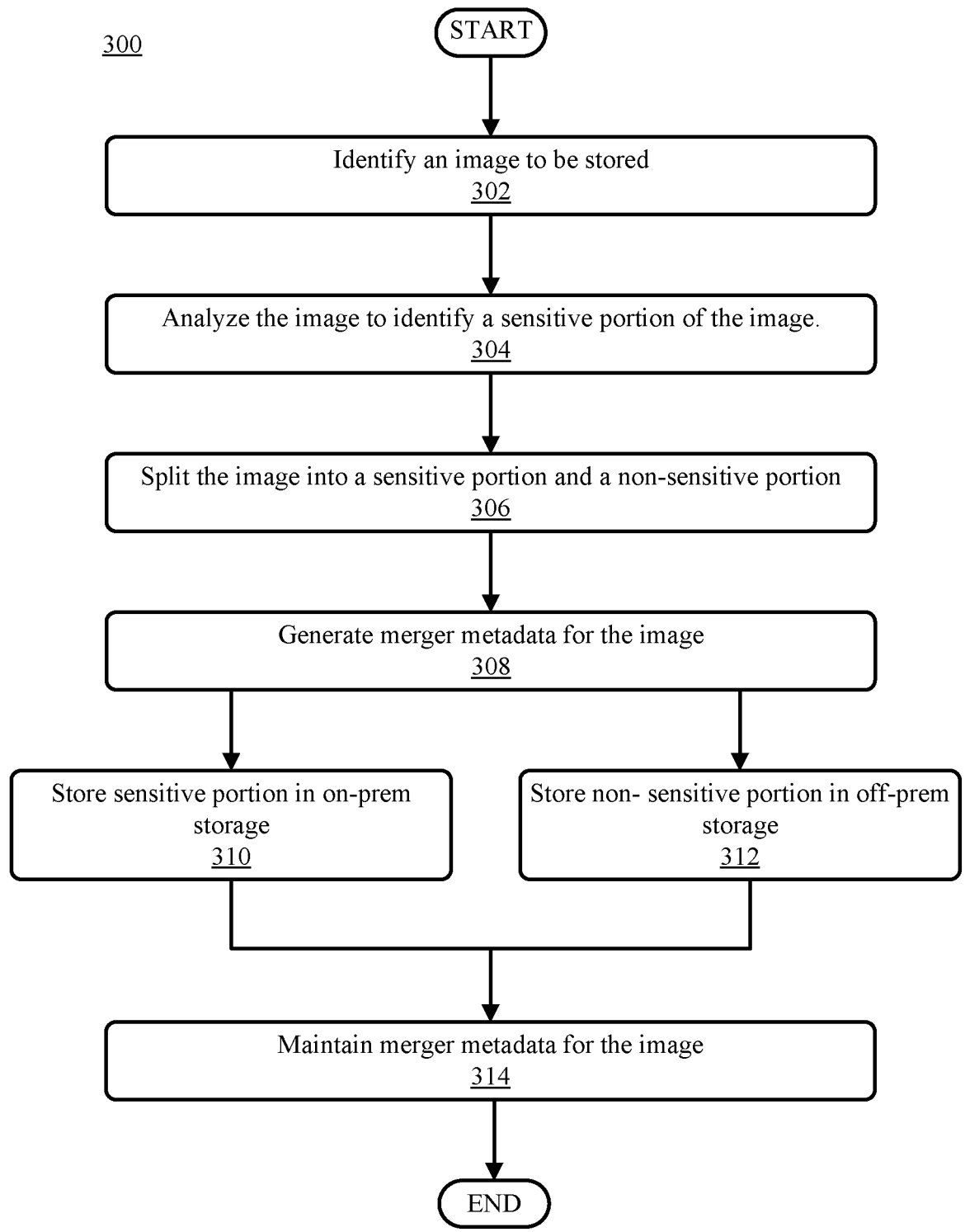
FIG. 3 illustrates a flowchart of an example method for splitting an image into multiple portions based on image sensitivity and storing the portions of images in different distributed computing systems, in accordance with embodiments of the present disclosure.

Referring now to FIG. 3, illustrated is a flowchart of an example method 300 for splitting an image into multiple portions based on image sensitivity and storing the portions of images in different distributed computing systems, in accordance with embodiments of the present disclosure. The method 300 may be performed by hardware, firmware, software executing on a processor, or any combination thereof. For example, the method 300 may be performed by a processor (e.g., in a server in a hybrid cloud 120). The method 300 begins at operation 302, wherein the processor identifies an image to be stored.

In some embodiments, the image may be identified shortly after it has been created. For example, a system may be set up to automatically review all images generated by an organization to determine whether it contains sensitive information and, if so, if it can be split. In other embodiments, the image may be identified as part of a process whereby a bunch of images are being analyzed. For example, the system may be set up to temporarily store all images in an on-premise storage node. Then periodically (e.g., weekly), the system may be configured to analyze the images for storage elsewhere, depending on their sensitivity.

At operation 304, the system analyzes the image to identify a sensitive portion of the image. The sensitive portion may include any text, object, or other information that is considered sensitive according to data compliance rules used by the system. For example, data compliance rules based on financial regulations may demand secure storage of personally identifiable information. Accordingly, the system may identify any such information (e.g., name, bank account number, etc.) in the text in an image and determine that the portion of the image containing that text is sensitive. Similarly, objects in the image may be considered sensitive. For example, medical scans may be considered sensitive, even if the scans themselves do not identify the patient.

As recognized by the present disclosure, however, not all of the image may be sensitive. For example, a scanned document may contain sensitive information in part of it (e.g., social security numbers, names, etc. in a header), while the rest of the document may contain non-sensitive information (e.g., publicly available information). As an illustrative example, the scanned document may be an attorney bar exam application form. The bar exam application form may be available on a state government's website, and as such most of the information in it may not be sensitive. However, the portions filled out by the applicant may include sensitive information.

Accordingly, the analysis at operation 304 can include identifying which portions of the image are sensitive, and which portions are not sensitive (e.g., contain no sensitive data). The analysis also includes identifying boundary information for the sensitive portions that define where in the original image the sensitive portions go. This boundary information can later be used to split the image (e.g., remove the sensitive portions) or put it back together.

At operation 306, the processor may split the image into a sensitive portion and a non-sensitive portion. The sensitive portion may be those parts of the image that contain sensitive data, while the non-sensitive portions are those parts of the image that lack any sensitive data. This essentially involves splitting the image into two partial images. The image may be split using known techniques for splitting or splicing an image and using the results of the analysis from operation 304.

At operation 308, the processor generates merger metadata for the image. The merger metadata, as disclosed herein, includes both the boundary information (e.g., the information determined at operation 304) and location data related to where the sensitive portion and the non-sensitive portion of the image will be stored.

After determining the merger metadata, the processor stores the sensitive portion of the image in a first distributed computing system (e.g., on-prem storage) at operation 310 and the non-sensitive portion of the image in a second distributed computing system (e.g., off-prem storage) at operation 312. The processor also stores the merger metadata for the image at operation 314, and the method 300 ends. The merger metadata may be stored in an image sensitivity database 254, as discussed herein.

In some embodiments, the various operations may be performed in a different order, and/or two or more of the operations may be performed simultaneously. For example, the merger metadata may be generated (operation 308) and stored (operation 314) prior to splitting the image (operation 306), in some embodiments. Similarly, operations 310 and 312 may be performed at the same time or sequentially.

In some embodiments, before identifying the sensitive portion of the image at operation 314, the processor may determine whether the image has previously been split and stored across distributed computing systems. For example, the processor may generate a hash of the image and compare it to hashes stored in the image sensitivity database 254. If there is a match, it may indicate that the image has already been split. Accordingly, instead of performing operations 306-314 for the image, the processor may simply create a link to the record in the image sensitivity database 254 that is associated with the image.

In some embodiments, the image may be split into more than two portions. For example, the system may have three or more tiers of storage, with each tier being associated with a different sensitivity level. In these embodiments, the sensitivity level of each part of an image may be determined, and the image may be split into one portion for each sensitivity level present. These portions may be sent to the corresponding storage tier. For example, a medical image may be split into three portions: a first portion that contains non-sensitive data, a portion that contains somewhat sensitive data (e.g., a patient's name), and a portion that contains highly sensitive data (e.g., a scan). The non-sensitive data may be sent to a public cloud storage cluster, while the somewhat sensitive data is sent to a more secure private cloud hosted by a third party, and the highly sensitive data is kept on-premise.

Figure 4:
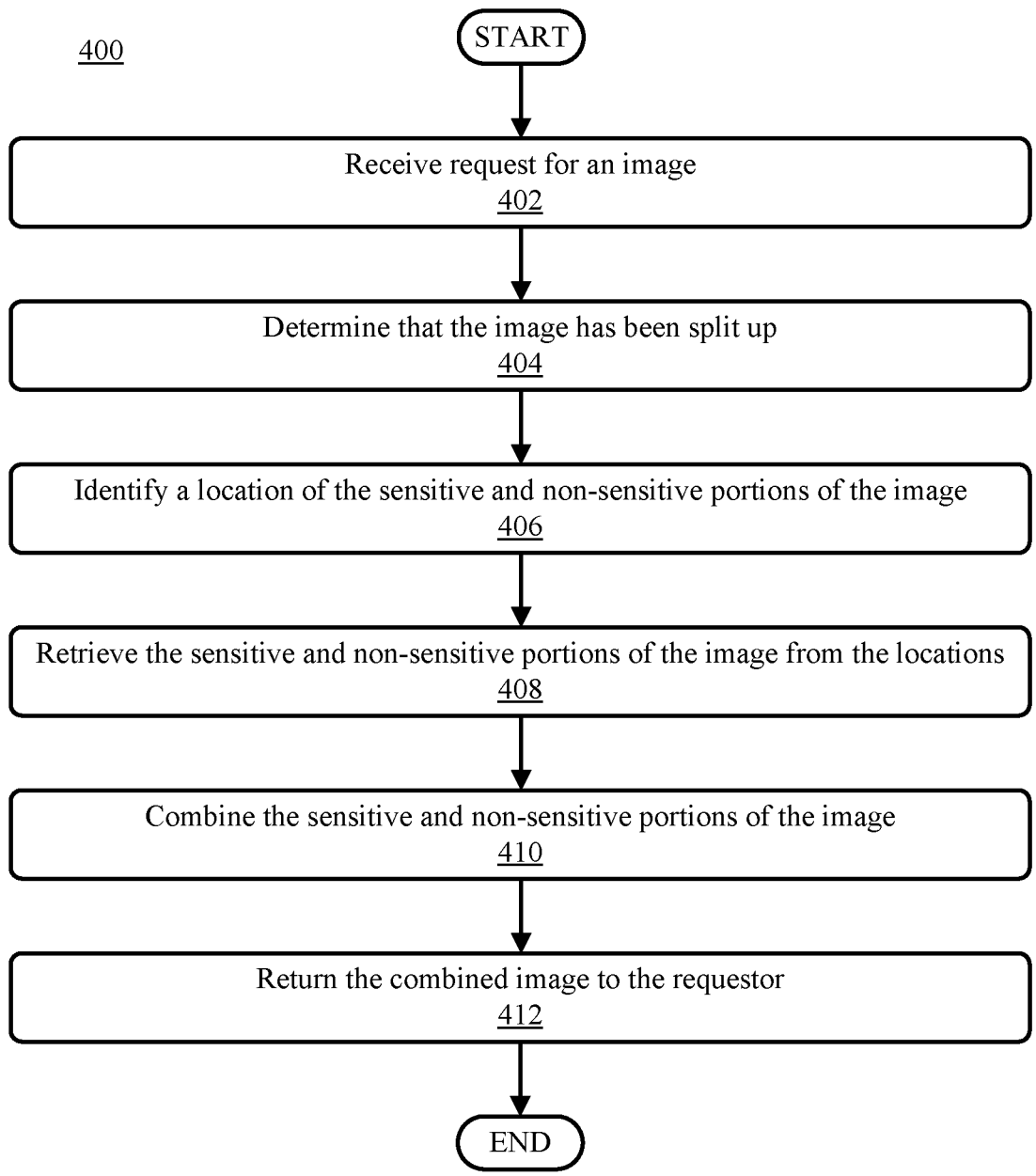
FIG. 4 illustrates a flowchart of an example method for responding to a request for an image that is stored across distributed computing systems, in accordance with embodiments of the present disclosure.

Referring now to FIG. 4, illustrated is a flowchart of an example method 400 for responding to a request for an image that is stored across distributed computing systems, in accordance with embodiments of the present disclosure. The method 400 may be performed by hardware, firmware, software executing on a processor, or any combination thereof. For example, the method 400 may be performed by a processor (e.g., in a server in a hybrid cloud 120). The method 400 begins at operation 402, wherein the processor receives a request for an image.

The request may come from, for example, a user or an application running on a remote system. In some embodiments, the processor may authenticate that the requestor has permission to access, receive, or view the image. If the requestor is permitted to receive the image, at operation 404, the processor determines that the image has been split into multiple portions. This may be done by looking the image up (e.g., by its name or other identifier) in an image sensitivity database 254. The image sensitivity database 254 record for the image may indicate that the image has been split into one or more sensitive portions and one or more non-sensitive portions.

At operation 406, the processor identifies the location of the sensitive and non-sensitive portions of the image. This may be done using information from the record for the image in the image sensitivity database 254. For example, the location data may indicate where each portion is stored (e.g., the distributed computing system, server, etc. that has the portions of the image).

At operation 408, the processor retrieves the sensitive and non-sensitive portions of the image from the distributed computing systems. For example, the processor may retrieve the sensitive portion of the image from an on-premise private cloud, while the non-sensitive portion of the image may be retrieved from an off-premise public cloud.

At operation 410, the processor combines the sensitive and non-sensitive portions of the image. The processor may utilize boundary information stored in the image sensitivity database 254 to determine how to combine the sensitive and non-sensitive portions of the image. After combining the sensitive and non-sensitive portions of the image into a combined (e.g., complete) image, the processor returns the combined image to the requestor at operation 412, and the method 400 ends.

Figure 5:
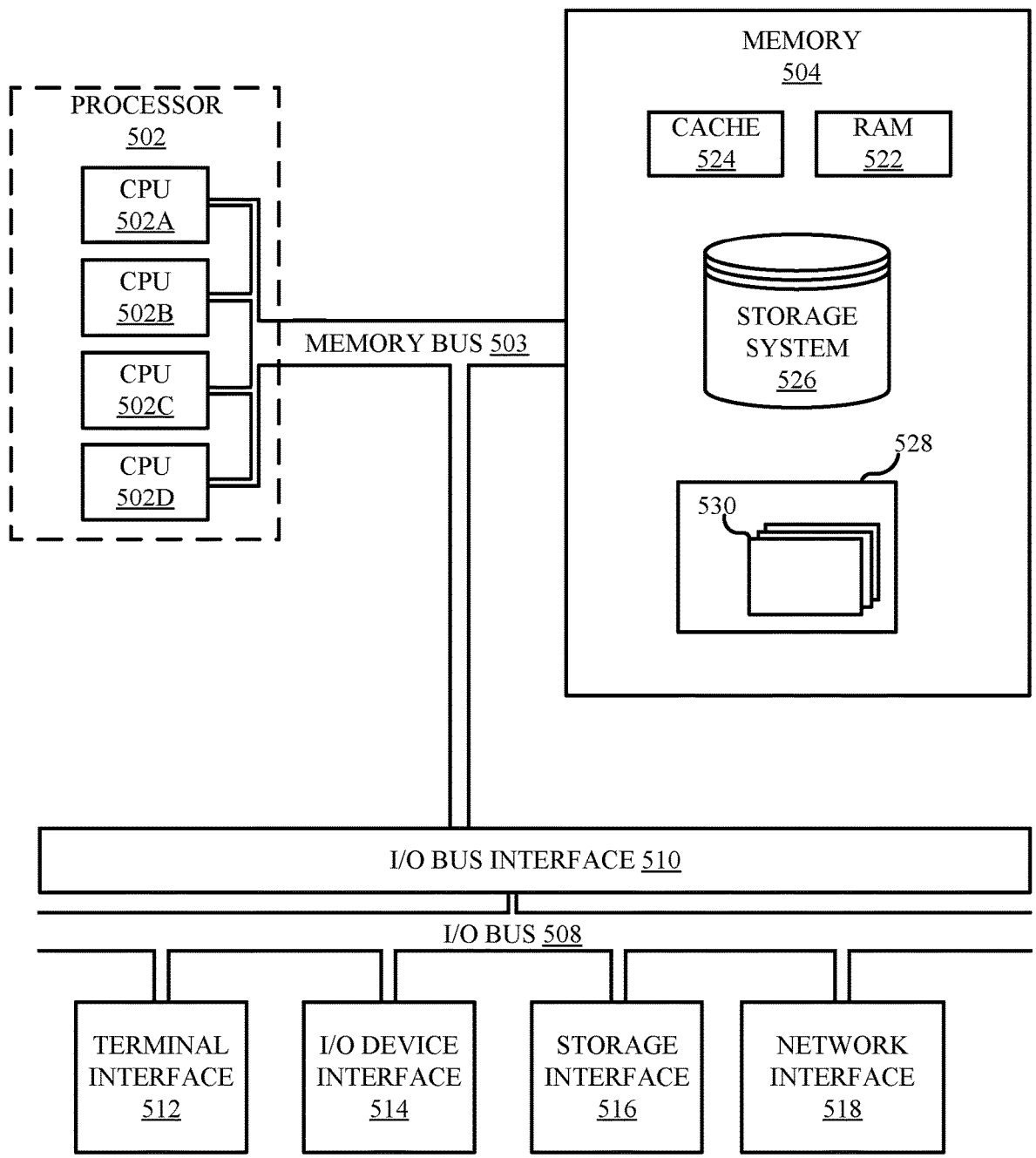
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
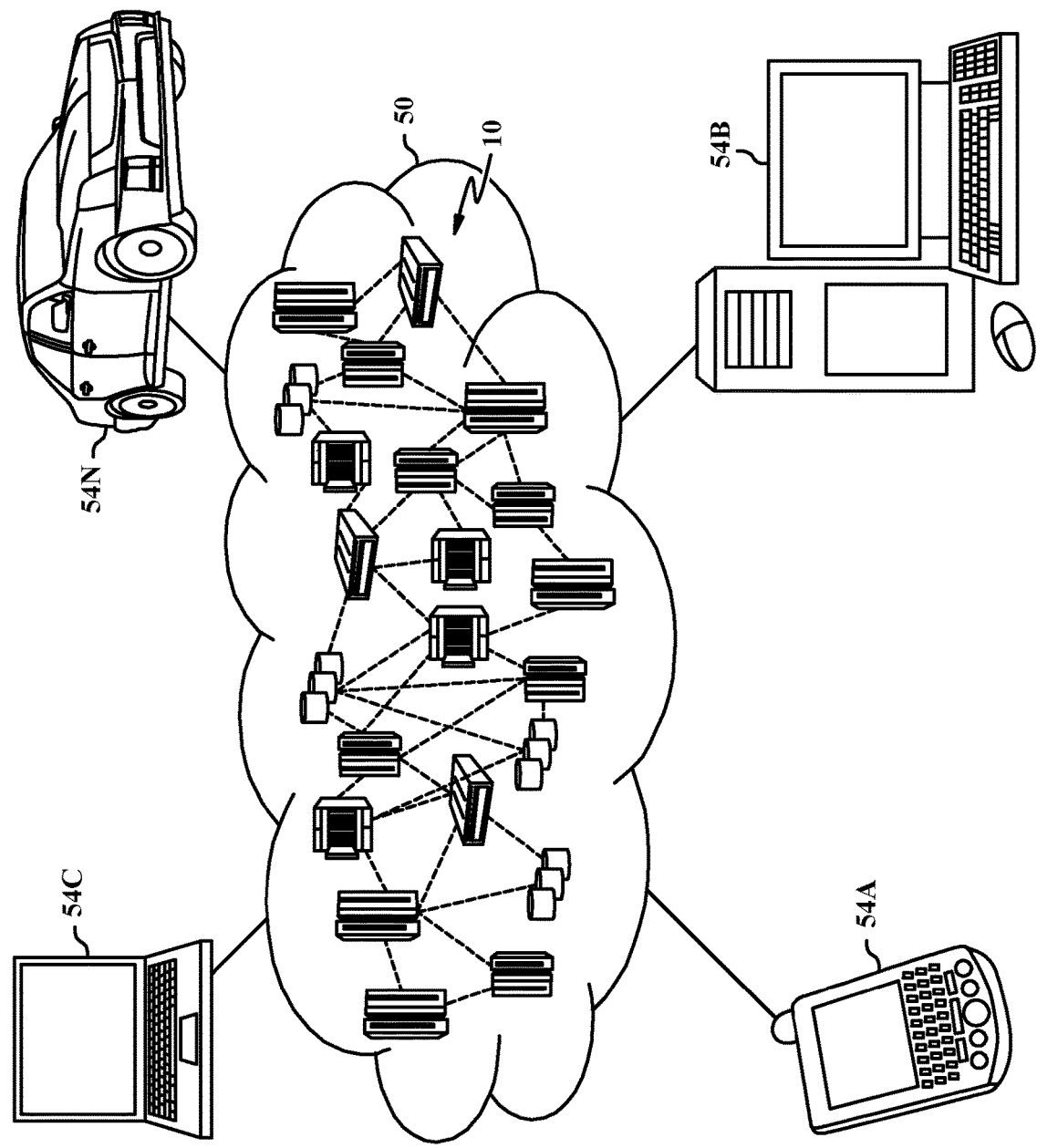
FIG. 6 depicts a cloud computing environment, in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
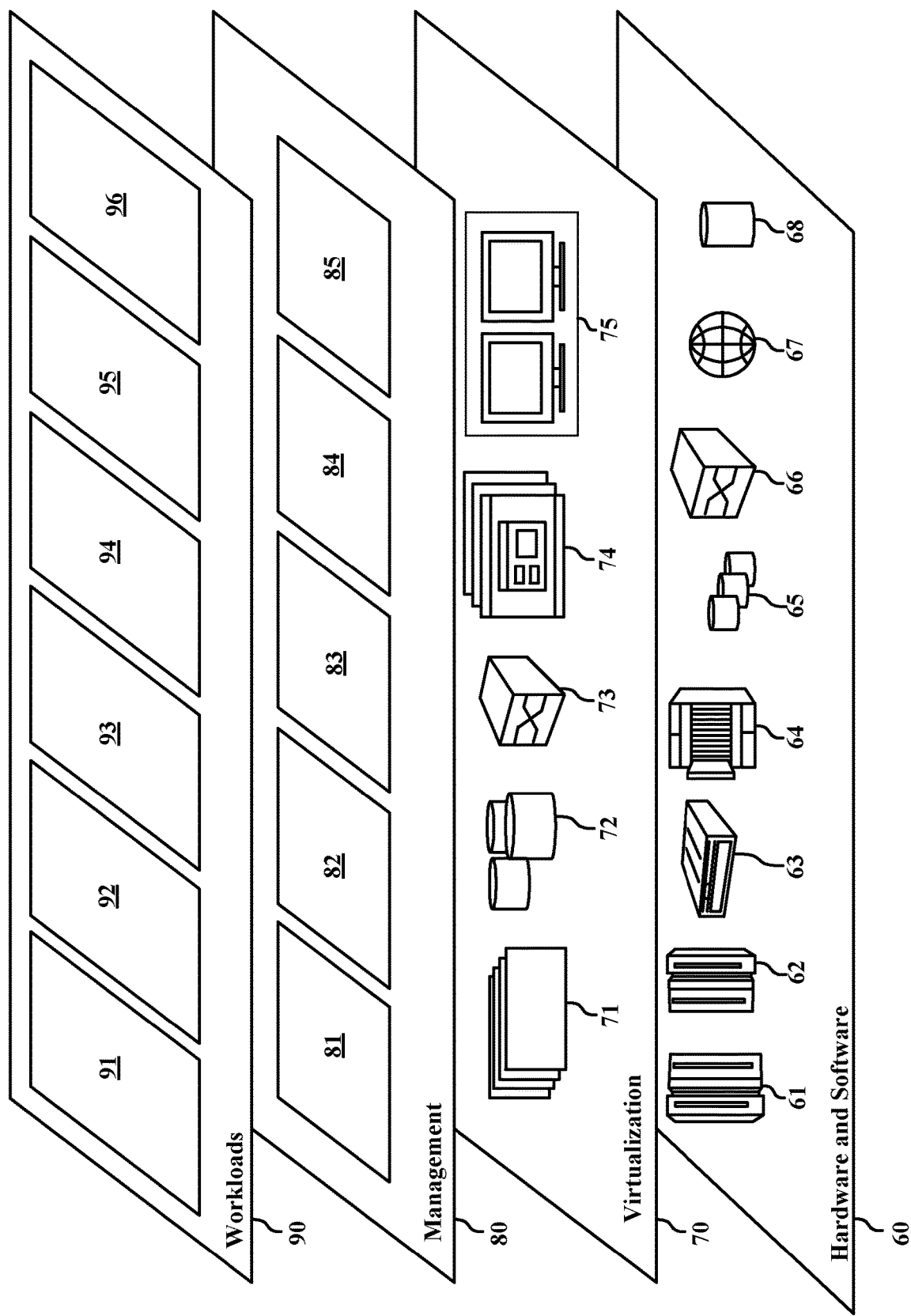
FIG. 7 depicts abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing application 96. The image processing application 96 may include instructions for performing various functions disclosed herein, such as splitting and/or recombining images based on the sensitivity of the image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method comprising:
   receiving a request for an image from a requestor, the image comprising a sensitive portion and a non-sensitive portion that have been split up and stored in a first distributed computing environment and a second distributed computing environment, respectively;
   receiving a list of sensitive clusters with a storage location in the first distributed computing environment;
   monitoring health check parameters of the storage location in the first distributed computing environment;
   generating a health score for the storage location in the first distributed computing environment;
   maintaining a data sensitivity level of each cluster in the list of sensitive clusters;
   identifying a first location data and a first boundary data for the sensitive portion, wherein the first location data identifies the storage location in the first distributed computing environment for the sensitive portion, and wherein the first boundary data identifies where the sensitive portion belongs in the image;
   identifying a second location data and a second boundary data for the non-sensitive portion, wherein the second location data identifies a storage location in the second distributed computing environment for the non-sensitive portion, and wherein the second boundary data identifies where the non-sensitive portion belongs in the image;
   authenticating that the requestor is permitted to receive the image;
   retrieving the sensitive portion from the first distributed computing environment and the non-sensitive portion from the second distributed computing environment;
   recombining, using boundary information for the sensitive and non-sensitive portions that is included in metadata associated with the image, the sensitive and non-sensitive portions to recreate the image, wherein both the sensitive and non-sensitive portions are visible in the recreated image; and
   returning the recreated image to the requestor.

2. The method of claim 1, wherein the retrieving comprises:
   determining, from an image sensitivity database, the first location of the sensitive portion in the first distributed computing environment and the second location of the non-sensitive portion in the second distributed computing environment.

3. The method of claim 1, wherein the first distributed computing environment has a higher security level than the second distributed computing environment.

4. The method of claim 1, wherein the first distributed computing environment is a private cloud and the second distributed computing environment is a public cloud, the public and private clouds being capable of communicating with each other as part of a hybrid cloud environment.

5. The method of claim 1, further comprising:
   determining, from the boundary information, the first boundary data for the sensitive portion and the second boundary data for the non-sensitive portion, wherein the first boundary data identifies where the sensitive portion belongs in the recreated image and the second boundary data identifies where the non-sensitive portion belongs in the recreated image.

6. The method of claim 5, wherein the metadata is stored in a database.

7. The method of claim 5, wherein the recombining the sensitive and non-sensitive portions to recreate the image is performed using the first and second boundary data.

8. The method of claim 7, wherein the recombining the sensitive and non-sensitive portions to recreate the image comprises stitching the sensitive and non-sensitive portions together along edges defined by the first and second boundary data.

9. The method of claim 1, wherein the health check parameters are selected from the following: firewall configuration, unauthorized access, and any other activity which might indicate potential misuse of the sensitive portion.

10. The method of claim 9, further comprising;
    determining that the health score falls below a threshold; and
    removing, based on the determining, the sensitive portion from the list of sensitive clusters.

11. A system comprising:
    a memory; and
    a processor communicatively coupled to the memory, wherein the processor is configured to perform a method comprising:
    receiving a request for an image from a requestor;
    authenticating that the requestor is permitted to receive the image;
    determining that the image has been split into a sensitive portion and a non-sensitive portion, the sensitive and non-sensitive portions being stored in a first distributed computing environment and a second distributed computing environment, respectively;
    receiving a list of sensitive clusters with a storage location in the first distributed computing environment;
    monitoring health check parameters of the storage location in the first distributed computing environment;
    generating a health score for the storage location in the first distributed computing environment;
    maintaining a data sensitivity level of each cluster in the list of sensitive clusters;

identifying a first location data and a first boundary data for the sensitive portion, wherein the first location data identifies the storage location in the first distributed computing environment for the sensitive portion, and wherein the first boundary data identifies where the sensitive portion belongs in the image;

identifying a second location data and a second boundary data for the non-sensitive portion, wherein the second location data identifies a storage location in the second distributed computing environment for the non-sensitive portion, and wherein the second boundary data identifies where the non-sensitive portion belongs in the image;

retrieving the sensitive portion from the first distributed computing environment and the non-sensitive portion from the second distributed computing environment;

recombining, using boundary information for the sensitive and non-sensitive portions that is included in metadata associated with the image, the sensitive and non-sensitive portions to recreate the image, wherein both the sensitive and non-sensitive portions are visible in the recreated image; and returning the recreated image to the requestor.

12. The system of claim 11, wherein the retrieving comprises:
determining, from an image sensitivity database, the first location of the sensitive portion in the first distributed computing environment and the second location of the non-sensitive portion in the second distributed computing environment.

13. The system of claim 11, wherein the first distributed computing environment has a higher security level than the second distributed computing environment.

14. The system of claim 11, wherein the first distributed computing environment is a private cloud and the second distributed computing environment is a public cloud, the public and private clouds being capable of communicating with each other as part of a hybrid cloud environment.

15. The system of claim 11, wherein the method further comprises:
determining, from the boundary information, the first boundary data for the sensitive portion and the second boundary data for the non-sensitive portion, wherein the first boundary data identifies where the sensitive portion belongs in the recreated image and the second boundary data identifies where the non-sensitive portion belongs in the recreated image.

16. The system of claim 15, wherein the metadata is stored in a database.

17. The system of claim 15, wherein the recombining the sensitive and non-sensitive portions to recreate the image comprises stitching the sensitive and non-sensitive portions together along edges defined by the first and second boundary data.

18. A computer program product comprising a computer readable storage medium having program instructions embodied therewith, the program instructions executable by a computer to perform a method comprising:
receiving a request for an image from a requestor;
authenticating that the requestor is permitted to receive the image;
determining that the image has been split into a sensitive portion and a non-sensitive portion, the sensitive and non-sensitive portions being stored in a first distributed computing environment and a second distributed computing environment, respectively;
receiving a list of sensitive clusters with a storage location in the first distributed computing environment;
monitoring health check parameters of the storage location in the first distributed computing environment;
generating a health score for the storage location in the first distributed computing environment;
maintaining a data sensitivity level of each cluster in the list of sensitive clusters;
identifying a first location data and a first boundary data for the sensitive portion, wherein the first location data identifies the storage location in the first distributed computing environment for the sensitive portion, and wherein the first boundary data identifies where the sensitive portion belongs in the image;
identifying a second location data and a second boundary data for the non-sensitive portion, wherein the second location data identifies a storage location in the second distributed computing environment for the non-sensitive portion, and wherein the second boundary data identifies where the non-sensitive portion belongs in the image;
retrieving the sensitive portion from the first distributed computing environment and the non-sensitive portion from the second distributed computing environment;
recombining, using boundary information for the sensitive and non-sensitive portions that is included in metadata associated with the image, the sensitive and non-sensitive portions to recreate the image, wherein both the sensitive and non-sensitive portions are visible in the recreated image; and
returning the recreated image to the requestor.

19. The computer program product of claim 18, wherein the retrieving comprises:
determining, from an image sensitivity database the first location of the sensitive portion in the first distributed computing environment and the second location of the non-sensitive portion in the second distributed computing environment.

20. The computer program product of claim 18, wherein the first distributed computing environment has a higher security level than the second distributed computing environment.

* * * * *